N. D. NIELSEN.
MEANS FOR MAKING BUTTERIN, OLEOMARGARIN, AND THE LIKE.
APPLICATION FILED APR. 18, 1918.

1,364,297.

Patented Jan. 4, 1921.
2 SHEETS—SHEET 1.

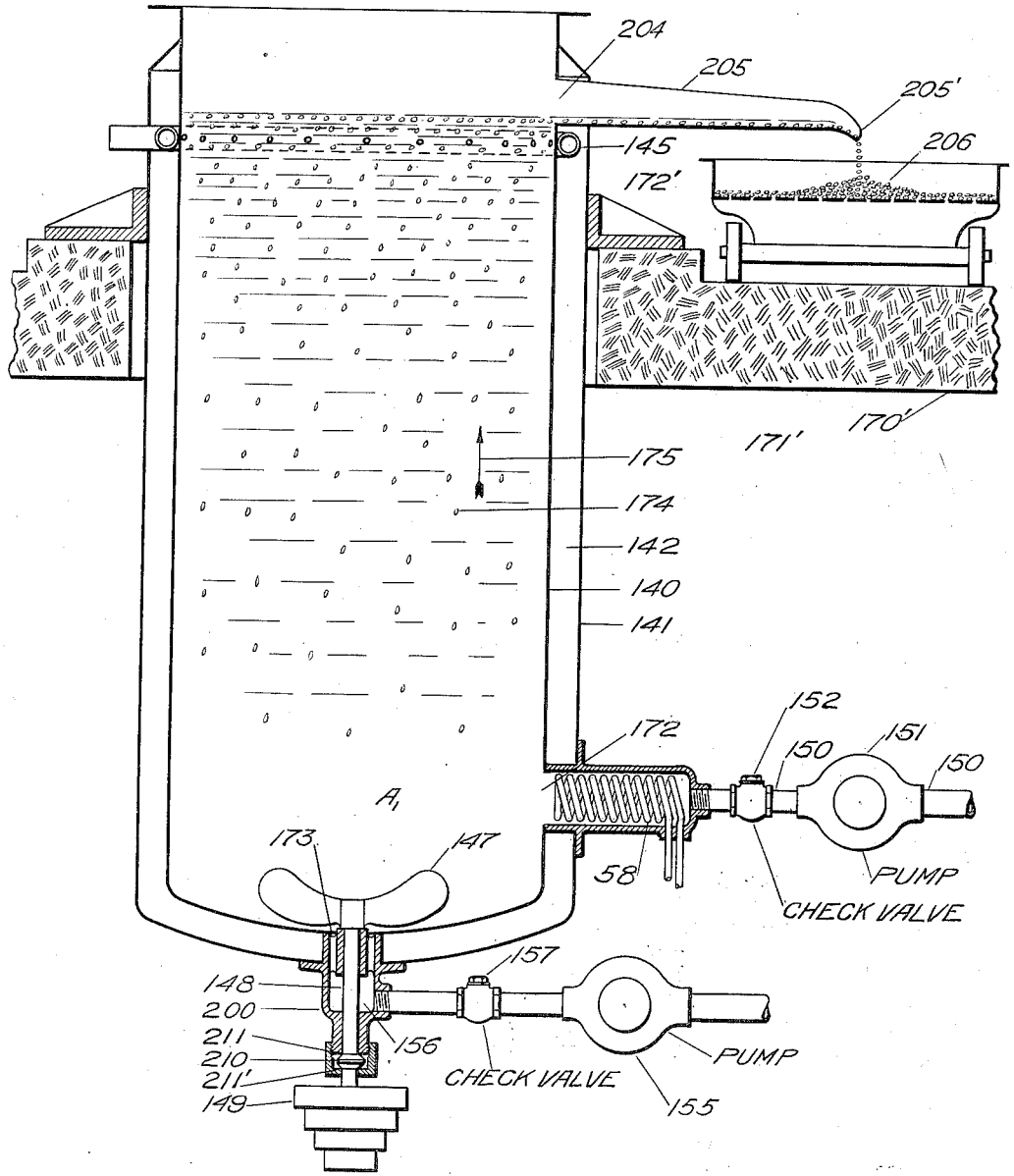

UNITED STATES PATENT OFFICE.

NIELS D. NIELSEN, OF ELYRIA, OHIO.

MEANS FOR MAKING BUTTERIN, OLEOMARGARIN, AND THE LIKE.

1,364,297.  Specification of Letters Patent.  Patented Jan. 4, 1921.

Application filed April 18, 1918. Serial No. 229,217.

*To all whom it may concern:*

Be it known that I, NIELS D. NIELSEN, a citizen of the United States, residing at Elyria, in the county of Lorain and State of Ohio, have invented certain new and useful Improvements in Means for Making Butterin, Oleomargarin, and the like; and I do hereby declare the following to be a full, clear, and exact description of the invention, such as will enable others skilled in the art to which it appertains to make and use the same.

My invention relates to the art of making butterin, oleomargarin and the like from a plurality of solutions, containing in suspension particles of fat, such as peanut oil, cocoanut oil, cotton seed oil, milk, cream and the like.

I aim to produce a product consisting of a more homogeneous mixture of the particles of the different substances employed. I also aim to simplify the means and methods employed in the manufacture of such substances.

These and other objects of the invention, as well as the invention itself, will be understood from a description of an embodiment thereof.

Fig. 2 is a similar view of another embodiment thereof.

Figure 1:
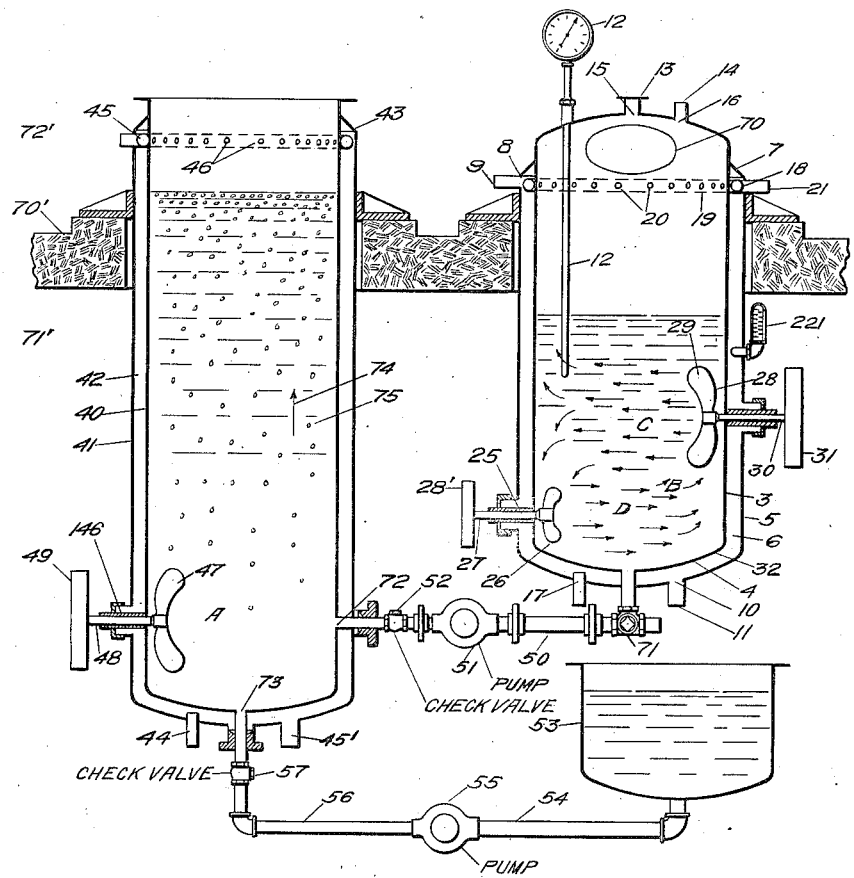
Figure 1 is a diagrammatic representation of an embodiment of my invention.

Referring now to the drawings, and first to the embodiment shown in Fig. 1 thereof, at 3 is shown a tank employed for emulsifying various kinds of oils or other fatty substances. In the embodiment shown, the tank is made cylindrical, with a saucer-shaped bottom 4, and surrounded with a jacket 5 forming a space 6 between the walls 3 and 5, into which a heating or cooling medium may be introduced for the purpose of modifying the temperature of the contents of the tank 3. An apron 7 is employed to close the top of the space 6, and may be connected to the tank and the jacket 5 in any suitable manner. At 8 is shown a stub duct entering the space 6 at an opening 9 through which the temperature changing medium may be introduced to the space 6. At 10 is shown an opening through which such mediums may be withdrawn into a duct, exemplified by the stud pipe 11.

At 12 is shown a thermometer by which the temperature of the interior of the tank 3 may be indicated. Suitable orifices 15 and 16 are provided for introducing substances to the interior of the tank 5. Suitable pipes 13 and 14 are employed associated with the orifices, and to which, of course, other sections of pipe may be connected. I also show an opening 17 through which steam or other temperature changing mediums may be introduced to the jacket 6, and at 18 is shown means by which a liquid may be introduced to the space 6 and sprayed upon the walls 3 of the tank. In the embodiment shown, the member 18 consists of a pipe 19, extending around the tank 3 and provided with a plurality of openings 20, from which the liquid is sprayed onto the walls of the tank. At 21 is shown a duct leading to the pipe 18. A thermometer 22 may be employed to indicate the temperature of the contents of the space 6.

Means are provided for mixing the different kinds of fatty substances run into the tank, so as to completely mix the different kinds of fatty particles and thereby produce a homogeneous or substantially homogeneous emulsion. Agitating means are shown at 25 and here consist of a propeller 26 mounted upon a shaft 27, extending through the walls 3 and 5. Suitable means, such as a pulley 28′, are provided for operating the propeller 26. Other agitating means 28 are employed and should be mounted, as shown in the drawing, on the opposite side of the tank and above the propeller 26. In the embodiment shown the means consist of a propeller 29 mounted upon a shaft 30 extending through the walls 3 and 5 and upon which the propeller 29 is mounted. Suitable means 31 are provided through which the propeller 29 is operated. The best results are realized by placing the propeller 29 so that it is entirely above the propeller 26. The two propellers are operated simultaneously, the propeller 26 driving the contents of the tank across the same, as indicated by the arrows at D, where some of it strikes the upwardly inclined bottom about the point marked 32, from which it is deflected upwardly, as indicated by the arrows at B, toward the propeller 29, which drives it across the tank to the opposite side, as indicated by the arrows at C.

Other currents are created than those indicated by the arrows. It will be seen, however, that the currents created by the propellers and deflected in various directions by the walls of the tank thoroughly mix the contents, exposing them evenly and uniformly to the heating or cooling medium in the chamber 6. It will also be seen that it will not be possible for any eddies to form in the mass of liquid thus operated upon by the propellers. By continuous operation of these means, it will be seen that the various fatty substances will be thoroughly emulsified, and that a homogeneous or substantially homogeneous emulsion will result. It will be appreciated that the propellers may be driven at any suitable rate of speed, and that the speed of one may be different from that of the other. It is also feasible to rotate the propellers at variable rates of speed, if desirable.

At 40 is shown a vessel in which the crystallization of the fatty particles takes place. It will be understood that in the manufacture of butterin, oleomargarin, or the like, the fatty particles in the emulsion should be crystallized or caused to agglomerate into crystals or small masses which should be homogeneous; that is, each crystal or agglomeration should contain substantially the same number of particles of a particular kind of fatty substance as is contained by the other crystal or agglomeration. These crystals or agglomerations are later merged into a mass, known as oleomargarin or butterin.

At 41 is shown a jacket about the tank 40, and which with the wall of the vessel 40 forms a chamber 42 into which heating or cooling mediums may be introduced to vary the temperature of the contents of the vessel. The top of the chamber 42 is closed by an apron 43. At 44 is shown means for introducing to, and at 45, means for withdrawing from, the chamber 42 some suitable temperature changing medium, which may be employed in the chamber 42. At 45' is shown means for introducing a temperature changing liquid to the chamber 42. The means 45 is similar to the means 19, and is provided with openings 46 through which a brine or other temperature changing means may be sprayed upon the walls of the tank 40 and permitted to run down over the same. Liquid agitating means is shown at 146, and here consists of a propeller mounted upon a shaft 48 extending through the walls of the chamber 42 and driven through any suitable means, such as a pulley 49.

A duct 50 is employed to convey the emulsion from the tank to the vessel, here illustrated as a pump 51. A check valve 52 should also be employed in the duct, preferably between the pump and the vessel 40.

At 53 is shown a source of water, preferably cool water, connected by a duct 54 to a second pump 55, the high pressure side of which is connected through a duct 56 and a check valve 57 to the vessel 40.

At 70' is shown the floor of a building separating the room 71' from the room 72'. The room 72' is maintained at a suitable living room temperature, whereas the temperature of the room 71' may preferably be maintained much lower. The mixing takes place at a temperature of about 83° F., and the water about the space A in the bottom of the vessel 40 is kept at about 33° F.

The operation of the system is as follows:

The oils or the like are introduced to the tank 3, for example, through the openings 13 and 14, or through the manhole 70. The propellers 26 and 28 are rotated at suitable speeds, stirring the mixture up. The propeller 26 drives the liquid in the direction of the arrows D, so that some of it strikes the portion 32 of the bottom of the tank and is deflected upwardly, carrying other liquid upwardly where it is caught by the propeller 29 and driven back across the tank. These and other currents cause a thorough emulsion of the fatty substances, as well as evenly distributing the oil and the resulting emulsions about the walls of the bottom of the tank, and evenly and uniformly exposing it to the heating medium, which may be steam, and which has already been drawn into the space 6. After the charge is thoroughly emulsified, the valve at 71 is opened and the pump 51 started, pumping the emulsion through the duct 50 and the orifice 72 into the vessel 40, which has already been filled with water brought to a temperature of about 33° F. by the use of a cooling medium introduced through 45. The pump 55 is used to force water into the vessel through an opening 73. The propeller 47 having been previously started and being kept constantly in operation, agitates the emulsion at such a rapid rate that the fatty and other particles composing the same are kept in the portion of the vessel adjacent the letter A. During this operation the particles are caused to engage each other and adhere, forming agglomerations or crystals, which are built up gradually in size, until they possess a certain buoyancy. The currents are so regulated that the particles are maintained in the space about A until after the crystals have attained a certain buoyancy, when the force thereof impelling the same upwardly is sufficient to carry them out of the sphere of the propeller 47, whereupon they are borne to the surface, as indicated by the particles 74 and arrows 75. It will be seen that the size of these particles may be determined by the forces which control their retention in the portion of the vessel about the letter A. The crystals may be removed from the top of the tank by workmen stationed in the room 72'. Of course, any suitable means may be employed for removing the crystals and straining the water from them.

In the embodiment shown in Fig. 2, a tank is shown at 140, the jacket at 141 and the chamber therebetween at 142. The cooling means is shown at 145, the floor at 170', the cold room at 171' and the heated room at 172'. The agitating means is shown at 147 and in the embodiment shown in Fig. 2, extends through the bottom of the tank 140. I prefer to have it pass through the duct 156 which is provided with an elbow 200 adjacent the opening 173 in the bottom of the tank. The propeller 147 is mounted upon a shaft 148, which carries means through which the propeller is rotated, here shown as a plurality of different sized pulleys 149, whereby the rate of rotation of the propeller may be varied. The pump for forcing the water into the vessel is shown at 155, and the check valve controlling the same, at 157.

The emulsifying tank is not shown in the embodiment illustrated in Fig. 2, but it will be obvious that such a tank as shown in the right-hand part of Fig. 1 may be employed and connected through a duct 150 with the vessel 140. At 151 is shown the pump for forcing the emulsion into the vessel 140, and at 152 is shown the check valve controlling the same. The opening 172 through which the emulsion is forced into the vessel 140 is preferably located on the side of the vessel, not far from the bottom thereof. The propeller is operated in such a way as to suck the emulsion down into the bottom and the cold water coming through the opening 173 tends to force it upwardly. The result of the effects of these forces upon the particles of the emulsion can be so regulated and controlled as to maintain the emulsion about the space $A_1$ until the crystals or agglomerations formed, as previously described, in the cold water in the space $A_1$ have reached such a size that their buoyancy will permit them to be carried out of the sphere of the propeller 147, whereupon they will rise to the surface.

At 204 is shown an opening in the vessel through which the crystals are floated down a passage-way 205, whence they may be dropped through a spout 205' into a truck 206, which may have a perforated bottom permitting the drainage of the water from the crystals.

The operation of the embodiment shown in Fig. 2 will be clear from the description of the operation of the apparatus shown in Fig. 1 and the description of the operations of the various elements explained in describing the apparatus of Fig. 2. Of course, the speed at which the emulsion enters the vessel 140 may also be controlled by the pump. It will be apparent that some suitable heating means, such as steam coils, as shown at 58, may be employed in connection with the duct 150, or with the ducts 156 or 50, if desired. Any suitable bearing arrangement may be employed for the shafts shown at 27, 30, 48 and 148. In the embodiment shown in Fig. 2, a conical thrust bearing 210 may be employed, which coöperates with a complementary thrust bearing 211 or 211' upon the part 200 of the pipe 156.

I have shown these embodiments of my invention and the details thereof for the purpose of better describing the invention. It will be apparent to those skilled in the art that the invention is not limited to such embodiments or the details thereof, and that many and numerous departures may be made from each, without departing from the spirit of the invention.

I claim:—

1. In apparatus of the class described, the combination of an emulsifying tank and a crystallization vessel, a duct connecting said tank and vessel and communicating with said vessel at or near the bottom thereof, a pump associated with said duct to force emulsions from said tank into said vessel, a propeller at or near the bottom of the vessel adapted to keep the emulsion adjacent the bottom of the vessel, but to permit crystals formed of the particles of such emulsion to rise to the surface of the tank, means to force cold water into said vessel and means to maintain the temperature of the contents of the vessel at below 40° F.

2. In combination, a vessel, means to introduce an emulsion of fatty particles to the vessel, said means passing through the side of the vessel just above the bottom thereof, means to introduce to said vessel a liquid whose specific gravity is greater than that of the fatty particles suspended in the emulsion, said vessel containing a quantity of liquid whose specific gravity is greater than that of the particles suspended in the emulsion, means whereby the temperature of the contents of the vessel is maintained at below 40° F., means to suck the emulsion downwardly in the vessel to cause it to circulate through the cooled liquid at or near the bottom of the vessel and to cause the particles of the emulsion to engage each other and adhere to form crystals of a certain size.

3. In combination, a vessel, means to introduce an upward-bound stream of water through the bottom of the vessel, means to oppose the upward movement of such stream of water, means to regulate the propelling and opposing forces applied to such stream of water and means to introduce to such stream of water an emulsion of fatty particles whose specific gravity is less than that of water, 4. In combination, a vessel, a duct entering the side of the vessel adjacent and above the bottom thereof, a pump to force through said duct and into said vessel a stream of an emulsion including in suspension a plurality of different kinds of fatty particles, a conduit entering the bottom of the vessel and means to force a stream of cold water into said vessel through said duct, a propeller in said vessel at the mouth of said conduit and means through which said propeller may be rotated at various speeds.

In witness whereof, I have hereunto signed my name this 15th day of April, 1918.

NIELS D. NIELSEN.